(No Model.) 2 Sheets—Sheet 1.

T. A. & W. T. JEBB.
Apparatus for Manufacturing Starch.

No. 243,270. Patented June 21, 1881.

Witnesses:
Chas. J. Buchheit
Edw. J. Brady

Thomas A. Jebb
William T. Jebb Inventors.
By Wilhelm & Bonner
Attorneys.

(No Model.) 2 Sheets—Sheet 2.
T. A. & W. T. JEBB.
Apparatus for Manufacturing Starch.
No. 243,270. Patented June 21, 1881.
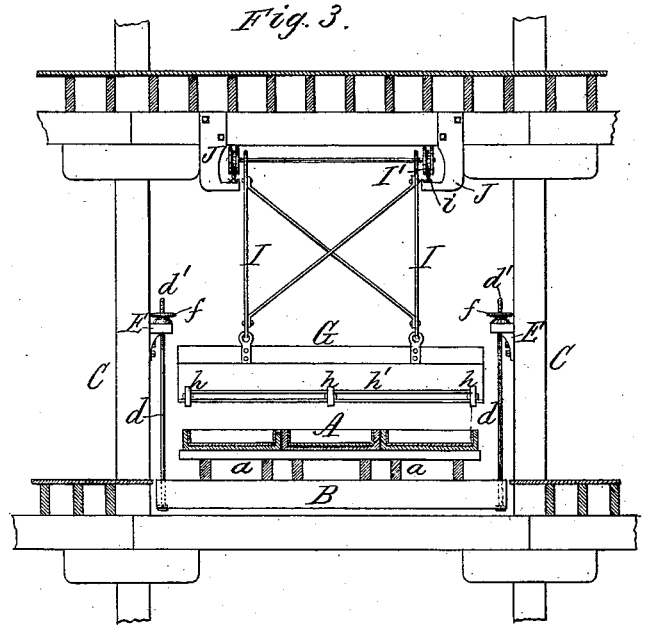
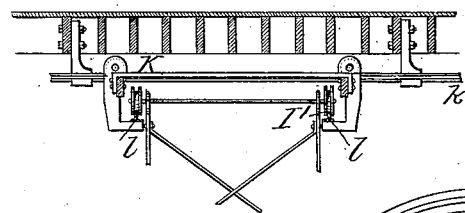
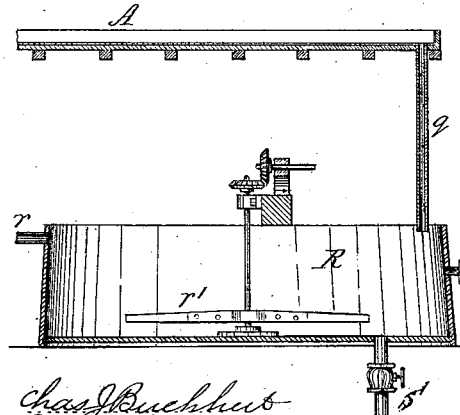
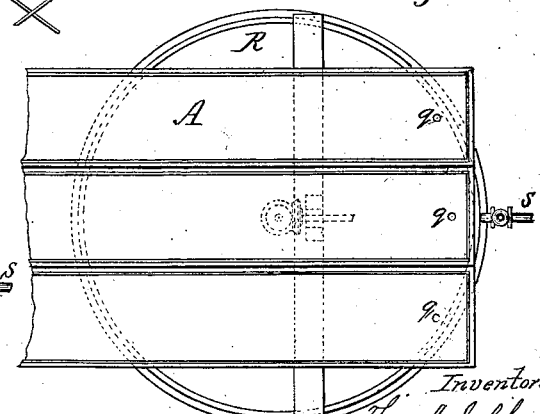
Witnesses:
Chas. J. Buchheit
Edw. J. Brady
Inventors:
Thos. A. Jebb
Wm. T. Jebb
By Wilhelm & Bonner
Attorneys

UNITED STATES PATENT OFFICE.

THOMAS A. JEBB AND WILLIAM T. JEBB, OF BUFFALO, NEW YORK.

APPARATUS FOR MANUFACTURING STARCH.

SPECIFICATION forming part of Letters Patent No. 243,270, dated June 21, 1881.

Application filed January 20, 1881. (No model.)

*To all whom it may concern:*

Be it known that we, THOMAS A. JEBB and WILLIAM T. JEBB, of the city of Buffalo, in the county of Erie, in the State of New York, have invented new and useful Improvements in Apparatus for Manufacturing Starch, of which the following is a specification, reference being had to the accompanying drawings.

This invention relates more particularly to apparatus which is employed in the manufacture of starch from Indian corn and other grain, for separating the gluten and other foreign matter from the starch, and which consists of slightly-inclined flat trays, tables, or pans, over which the liquid containing the starch is caused to run. It is essential to the proper separation of the refuse from the starch that these tables should be maintained in their proper position; and as these tables, owing to their great length, are liable to change their position frequently from the settling or warping of the supports or other causes, it becomes necessary to provide means for adjusting the tables.

The object of the first part of our invention is to provide means whereby the starch-tables can be readily adjusted by the men working on the tables; and it consists of mechanism whereby the starch-tables are adjustably suspended.

Our invention consists, further, of means whereby the starch is readily removed from the tables and conducted to the mixing or diluting tank, and of an apparatus whereby the starch that may accidentally escape from the tables with the refuse is recovered, as will be hereinafter fully set forth.

Figure 1:
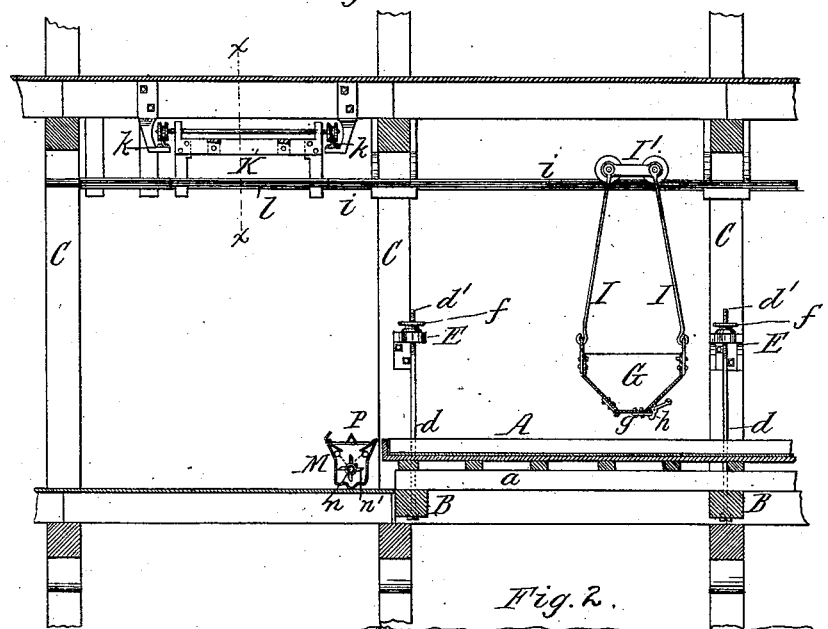
Figure 2:
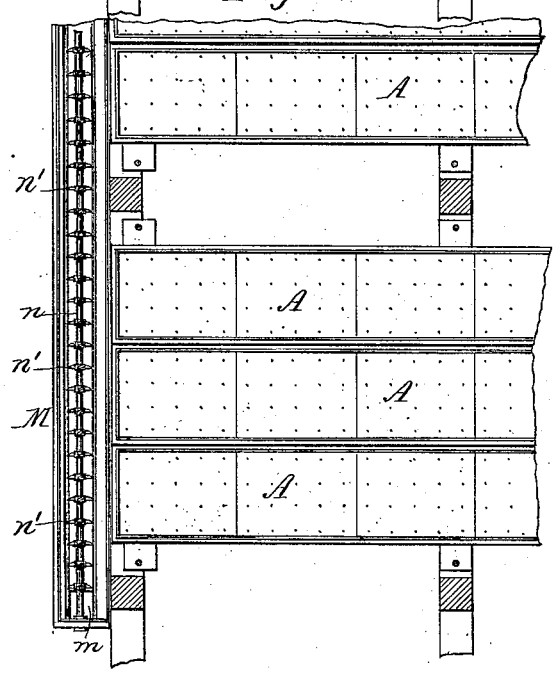
Figure 7:
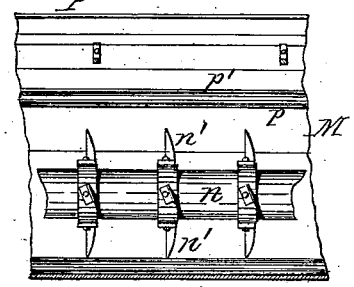
Figure 8:
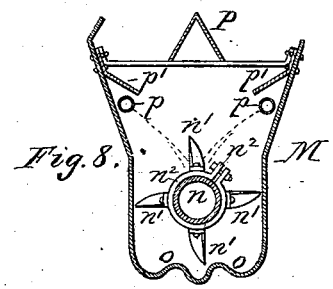

In the accompanying drawings, consisting of two sheets, Figure 1 is a sectional elevation of the head portion of a series of starch-tables provided with our improvements. Fig. 2 is a top-plan view of the head portion of the starch-tables. Fig. 3 is a cross-section of the same. Fig. 4 is a sectional elevation of the tail portion of the starch-tables. Fig. 5 is a top-plan view thereof. Fig. 6 is a vertical section in line $x$ $x$, Fig. 1. Fig. 7 is a fragmentary longitudinal sectional elevation of the starch-trough. Fig. 8 is a cross-section of the same.

Like letters of references refer to like parts in the several figures.

A represents a starch-table of the usual construction. As shown in the drawings, three tables are preferably arranged side by side, and supported upon stringers $a$ upon cross-sills B, which project beyond the sides of the tables A, and are arranged between the posts C of the building. The cross-sills B are suspended by vertical rods $d$, which are secured with their lower ends to the ends of the sills B, and which have their upper ends, $d'$, provided with screw-threads. The upper ends, $d'$, of the rods $d$ project through brackets E, which are secured to the posts C.

$f$ represents screw-nuts applied to the threaded upper ends, $d'$, of the rods $d$, and resting upon the brackets E, thereby supporting the starch-tables A. By turning the screw-nuts $f$ in one or the other direction the rods $d$ are raised or lowered, together with the starch-tables, and by properly adjusting the several rods $d$ the desired inclination of the tables is readily produced and maintained. The cross-sills B may be constructed of iron, to prevent them from sagging.

G represents a traveling starch-receptacle arranged above the tables A, and extending across the entire number of tables forming one set, so that the starch from all three tables can be deposited in the same receptacle. As shown in the drawings, the receptacle G consists of a box or trough open at the top and having inclined sides and a movable bottom, $g$, which is hinged or otherwise attached to the body of the receptacle G, so that the bottom can be opened and the contents of the receptacle be discharged when required. As shown in the drawings, the bottom $g$ is hinged to the body of the receptacle G at one side, and held at the other side by latches or hooks $h$, which are connected by a rod, $h'$, so that all the hooks can be engaged and released simultaneously. The receptacle G is suspended by rods I from rollers I', which run on rails $i$, running lengthwise of the starch-tables, and at a convenient height above the same. The rails $i$ are supported by brackets or hangers J, which are secured to the timbers overhead, or by any other suitable means.

K represents a transfer-carriage running on rails $k$, which are arranged at right angles to the rails $i$, and above the same. The carriage K is provided with rails $l$, which form a movable portion of the tracks $i$. When the carriage K is so arranged that its rails $l$ are in line with the rails $i$ the receptacle G can be run on the rails $l$, and by moving the carriage K on the rails $k$, on which it runs, the receptacle G can be placed in line with the track over a second and third series of starch-tables, arranged parallel with the tables A, and the receptacle G be transferred to the track over such second and third series of starch-tables, thereby permitting the same starch-receptacle to be used in connection with all of the starch-tables on the same floor.

M represents the starch-trough, which is arranged along the heads of all the starch-tables, and which leads to a discharge-spout, $m$, by which the starch is delivered into the diluting or settling tank. The trough M is provided with a shaft, $n$, having cutters $n'$, which reduce the lumps of starch. The shaft $n$ is preferably made of gas-pipe, and the cutters $n'$ may be made of malleable cast-iron and riveted to rings or clasps $n^2$, which are secured to the shaft $n$ by clamping-screws, as shown, or otherwise. The shaft $n$ is driven by a pulley or gears, as may be most convenient.

$o$ represents one or more longitudinal corrugations or ribs, formed in the bottom of the trough M for the purpose of holding the starch while the cutters operate upon the same, and preventing the lumps from rotating with the cutters without being comminuted thereby.

$p$ represents a perforated water-pipe, arranged on each side of the trough M, so as to deliver a spray of water upon the starch; and $p'$ are deflecting-plates, which protect the pipes $p$.

P is a hood arranged longitudinally over the cutters $n'$, whereby the lumps of starch are prevented from falling directly upon the cutters and injuring the same. The cutters $n'$ are set upon the shaft $n$ with a slight draft, whereby they are enabled to propel the material toward the discharge-opening of the trough while reducing the lumps of starch.

$q$ represents pipes through which the refuse, such as glutinous matter and other impurities, is discharged from the tail ends of the starch-tables A. The pipes $q$ deliver the refuse into a settling tank or vat, R, which is provided with an overflow-pipe, $r$, and a rotating stirrer, $r'$. The refuse liquid comes to a state of comparative rest in the tank R, whereby the heavy impurities, such as gluten, alkali, &c., settle to the bottom, the starch remaining in the middle stratum of the liquid, and the light scum passing off by the overflow $r$. The material which has accumulated in the tank R, and which consists of starch suspended in the liquid and a deposit of gluten, &c., is then separated by drawing the starchy liquid off through the pipe $s$. The heavy deposit is agitated and washed from time to time to recover all the starch commingled therewith, and the refuse is discharged through the pipe $s'$.

The trough M is preferably constructed of sheet-iron or of wood and lined with zinc, and the starch-tables A are preferably constructed of wood and lined with sheet iron or zinc. The plates of sheet iron or zinc are secured in place by countersunk screws, the heads of which are covered with solder, so as to form a smooth surface, which can be readily freed from any adhering matter by washing the parts with a stream of water. The starch settles principally near the heads of the tables, where the liquid is fed upon the latter, and a great portion of the starch can be shoveled directly from the tables into the trough M. The starch which settles on the more remote portions of the tables is shoveled into the receptacle G, and when the latter is filled it is moved over the trough M, and its contents are discharged into the same. In order to expedite this work, several receptacles G may be used in connection with the same series of starch-tables, when the several receptacles are filled simultaneously and moved successively over the starch-trough M, where their contents are discharged, the emptied receptacles being moved upon that portion of the track $i$ which extends beyond the trough M.

By this improved apparatus the position of the starch-tables is readily regulated, and the separation of the starch from the refuse is easily controlled, the waste of starch by its escaping with the refuse is entirely avoided, the removal of the starch from the starch-tables is greatly expedited, and the conveying of the starch to the diluting-tanks is facilitated, and the latter are relieved from a great portion of the work, as the starch, when it reaches the diluting-tank, is already reduced and diluted to a considerable extent, and the starch-passages are so constructed that they can be easily kept clean.

We claim as our invention—

1. The combination, with one or more starch-tables, A, of adjustable suspending-rods $d$, connected with their lower ends to cross-sills B and with their upper ends to brackets E, substantially as set forth.

2. The combination, with a starch-table, of a traveling starch-receptacle, G, suspended on rails $i$, arranged longitudinally over the table, substantially as set forth.

3. The combination, with two or more starch-tables or sets of starch-tables, of tracks $i$, arranged longitudinally above the same, a starch-receptacle, G, suspended from the tracks $i$ by rods I and rollers I', and a transfer-carriage, K, whereby the suspended receptacle G can be transferred from one table to another, substantially as set forth.

4. The combination, with a starch-table, of a trough, M, arranged at one end of the table, and a traveling starch-receptacle, G, whereby the starch is conveyed from the table to the trough, substantially as set forth.

5. The combination, with a starch-table, of the trough M, provided with a discharge-opening, $m$, for the comminuted starch, and rotating cutters $n'$, mounted spirally on a shaft within the trough, whereby the lumps of starch are simultaneously broken up and propelled toward the discharge-opening m, substantially as set forth.

6. The combination, with the trough M, of the rotating cutters n', and one or more longitudinal corrugations or ribs, o, arranged on the bottom of the trough, substantially as set forth.

7. The combination, with a starch-trough, M, provided with rotating cutters n', of one or more water-pipes, p, substantially as set forth.

8. The combination, with the trough M, provided with rotating cutters n', of the protecting-hood P, substantially as set forth.

9. The combination, with the trough M, provided with rotating cutters n', of the water-pipes p, deflecting-plates p', and protecting-hood P, substantially as set forth.

10. The combination, with a starch-table, of the settling-tank I, arranged to receive the refuse which escapes from the table, and provided with a stirring mechanism, an overflow, and a device for drawing off the heavy deposit, substantially as set forth.

THOMAS A. JEBB.
WILLIAM T. JEBB.

Witnesses:
   JNO. J. BONNER,
   EDWARD WILHELM.